Feb. 3, 1970  E. J. STRANG ET AL  3,493,028
APPARATUS FOR PROTECTING VEHICLE RIMS
Filed Dec. 14, 1966  2 Sheets-Sheet 1
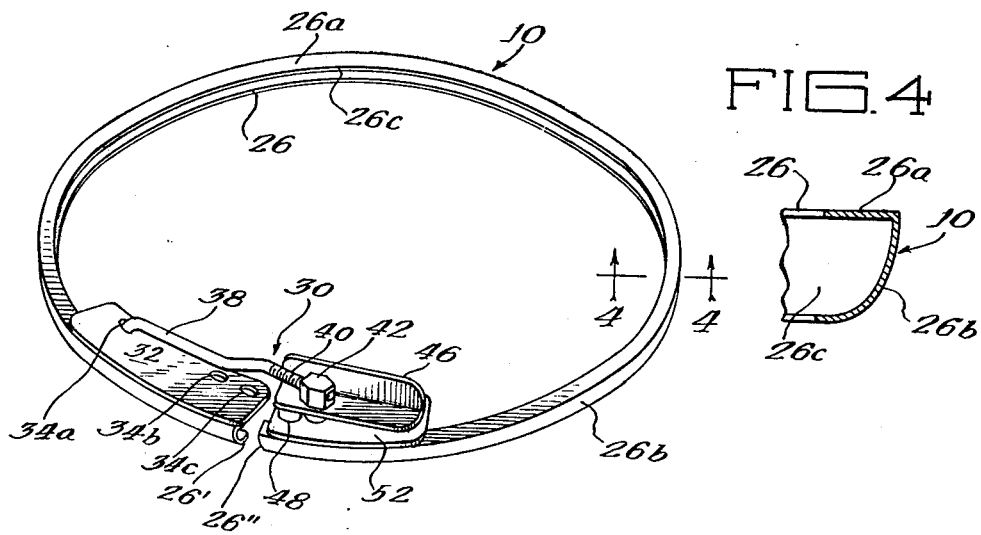
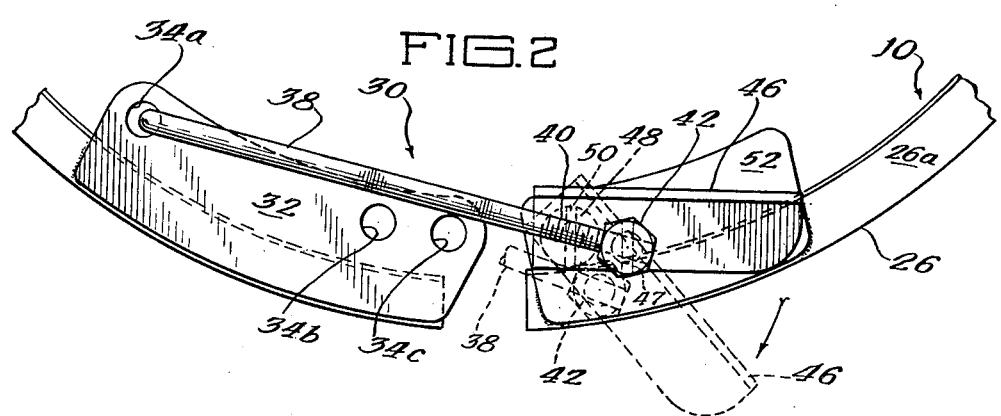
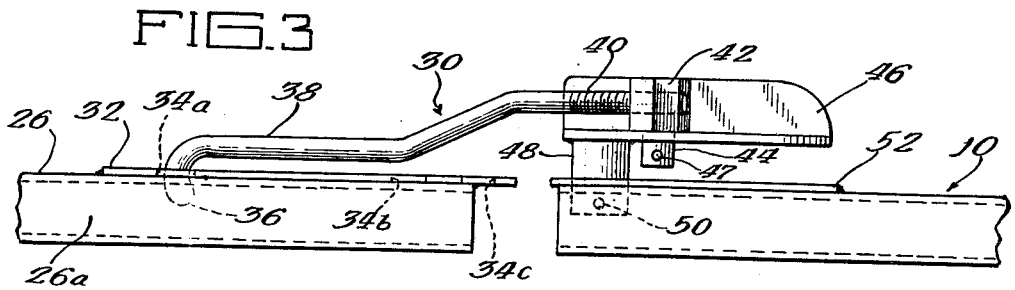
Inventors:
Elmer J. Strang
Ray A. Scott
By: Hofgren, Wegner, Allen,
Stellman & McCord
Attorneys

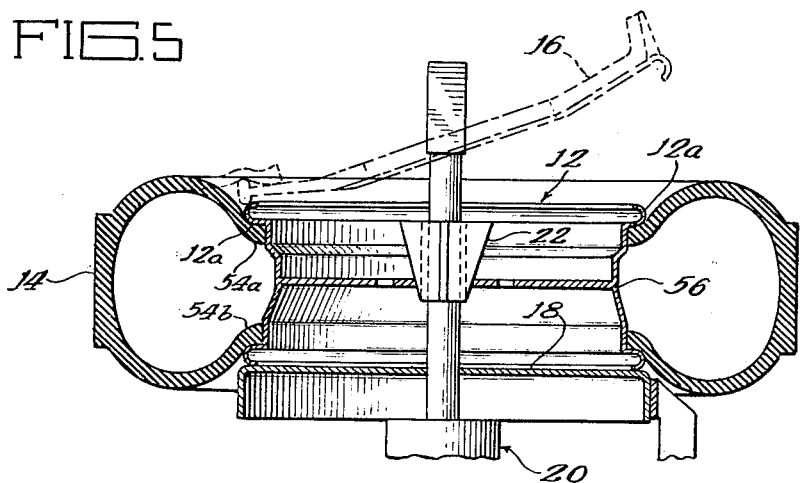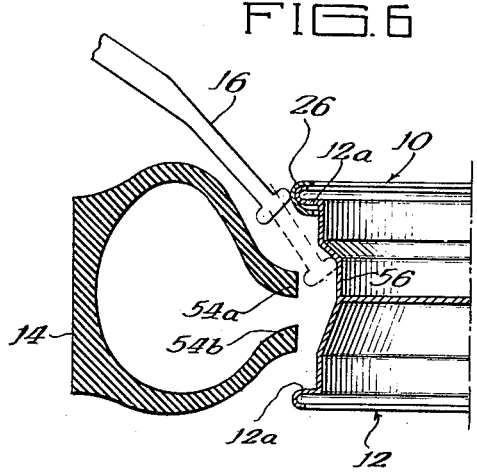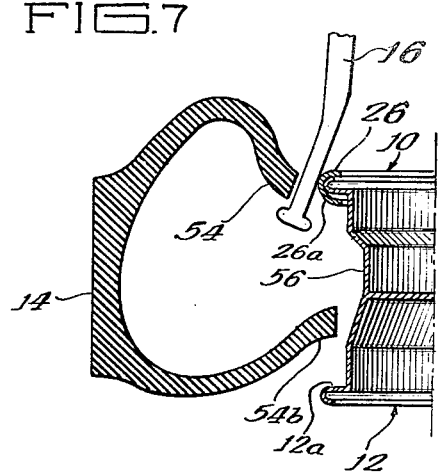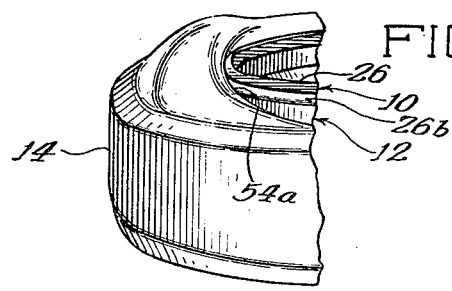

United States Patent Office 3,493,028
Patented Feb. 3, 1970

3,493,028
APPARATUS FOR PROTECTING VEHICLE RIMS
Elmer J. Strang and Ray A. Scott, Fort Dodge, Iowa, assignors to The Coats Company, Inc., a corporation of Iowa
Filed Dec. 14, 1966, Ser. No. 601,650
Int. Cl. B60c 25/02, 25/00
U.S. Cl. 157—1  3 Claims

ABSTRACT OF THE DISCLOSURE

Disclosed herein is a vehicle rim bead flange shield for use on a vehicle rim during tire mounting or demounting operation to protect the rim bead flange. In the embodiment disclosed, the shield is in the form of a ring-like band of hard metal or the like bent upon itself with closely spaced opposed free ends, being generally of a size and shape to embrace the bead seat flange of a vehicle rim. The band is capable of expanding and contracting to facilitate mounting of the band on different sized rims and the free ends of the band have a hook and aperture locking means to lock the shield on the rim bead flange during use.

---

This invention relates to tire changing equipment and more particularly to a protective member for use on soft metal or decorative rims.

Recently there has been an increasing number of rims produced and sold which are made of relatively soft metals, such as aluminum or magnesium. In addition, there has been an increase in the number of decoratively plated or chromium rims which have been sold. Rims which are made of such soft metals or so decoratively plated cannot take the abuse which ordinary steel painted rims can take without detracting from their appearance.

During the tire mounting and demounting operation, a tool is used to pry the tire bead over the bead flange of the tire rim. This tool is also used to reinsert the bead behind the bead flange of the rim when the tire is remounted on the wheel rim. Typically these tire handling tools are heavy and made of cast iron, heavy steel or the like. The prying action involved in mounting and demounting the tires relative to the rim includes the use of the outer edge of the bead flange as a fulcrum about which the tool pries. In the case of those rims which are made of soft metal or are decoratively plated, this prying action may cause damage.

This invention is directed, in brief, to the provision of a protective member for use over the bead seat flange of a soft metal or decorative tire rim during the mounting and demounting of a tire relative to the rim to protect the rim from the relatively abusive action afforded by tire changing tools used to pry the tire beads over the bead flange of the tire rim.

It is a primary object of this invention to provide a novel protective member for use on vehicle rims during the tire mounting and demounting operations.

It is another object of this invention to provide a new and improved protective member for use on the bead seat flange of soft metal or decorative tire rims to protect the bead seat flange against the prying action of a tire tool during mounting and demounting of tires relative to the rim.

Another object of this invention is to provide such a protective member which may be capable of use with rims of different radial size. A further object is the provision of such a protective member which may be easily locked on, or removed from, rims of different radial sizes.

Yet a further object of this invention is to provide a new and improved protective member for temporary installation over the surface of a rim normally subjected to abusive action during tire mounting and demounting to protect the aforesaid rim surface during such operations.

Other objects, features and advantages of the present invention will be apparent from the following description of the preferred embodiments illustrated in the accompanying drawings, in which:

FIGURE 1 is a perspective view of the rim shield of this invention shown in a closed, locked position;

FIGURE 2 is a fragmentary enlarged plan view showing portions of the locking means in phantom outline in an unlocked position, and in full outline in a locked position;

FIGURE 3 is a fragmentary side elevational view of the structure shown in plan in FIGURE 2;

FIGURE 4 is a fragmentary enlarged sectional view taken generally along the line 4—4 of FIGURE 1;

FIGURE 5 is a sectional view of a tire rim with a tire mounted on the rim, the rim being supported upon a tire changing stand for mounting or demounting the tire relative to the rim;

FIGURE 6 is a fragmentary sectional view of a tire rim and tire showing the tire with its beads separated or "broken" from the rim bead flange and the rim shield of this invention about the upper bead flange with a tire tool shown being inserted for use preparatory to prying the tire bead over the tire rim;

FIGURE 7 is a view similar to FIGURE 6 showing the tire tool prying the tire bead over the rim flange with the tool directly bearing against the rim shield of this invention; and FIGURE 8 is a fragmentary perspective view of a tire rim having the rim shield of this invention around the bead flange thereof and showing a tire casing being removed from the rim.

Rim shield 10 disclosed herein is the best mode contemplated by the inventor for carrying out the invention. Rim shield 10 is intended for use on the bead flange 12a of a rim 12 during the operation of removal or mounting of a tire 14 relative to the rim to protect the rim bead flange 12a from the abusive action of a tire tool 16. During tire mounting and demounting, the tire and rim may be held on the supporting platform 18 of a tire changing stand 20 and may be secured thereat by suitable locking or clamping means 22.

The rim shield 10 of this invention includes a generally circular cylindrical ring or band portion 26 preferably formed of a hard metal or the like. Band 26 is bent upon itself to form a ring generally of a size and shape to embrace the bead flange area of a vehicle rim, having free ends 26' and 26" generally spaced apart so that the band may flex relative to itself to accommodate minor dimensional variations in rim sizes. As is shown in FIGURE 4, in cross section the band 26 has a generally flat top 26a and an inwardly curved side 26b providing a cavity 26c between top 26a and side 26b, within which the bead flange 12a is located when the shield 10 is mounted thereabout as shown in FIGURES 6 through 8.

Band 26 includes a locking means 30 for fastening the free ends together about the bead flange of a tire rim. Locking means 30 includes a latch plate 32 which is welded to the top 26a and extends generally inwardly therefrom near one free end. Latch plate 32 is provided with a plurality of spaced first latch elements or apertures 34a, 34b and 34c which provide a means for adjusting the band 26 to encircle different size rims.

The apertures 34a, 34b and 34c are so sized as to receive the downturned end 36 of an adjusting hook or second latch element 38. The opposite end of hook 38 is threaded at 40 for securement into a nut or swivel n 42 which includes a reduced shank 44 that extends rough a latch handle 46 to pivotally secure the nut, d therefore hook 38, relative to handle 46 by means pin 47 extending through the shank 44. A stud 48 is nnected to the underside of handle 46 and a pin 50 tends through the stud below support plate 52 to pivally connect handle 46 to plate 52. Support plate 52 also secured by means such as welding to the top 26a f band 26 near the opposite free end from latch plate 32. ecause the adjusting hook 38 is pivoted to handle 46 a point spaced from the pivot point of the handle with spect to support plate 52, hook 38 may travel laterally the handle 46 is swung about its mounting on plate 52.

To mount the shield 10 about the bead flange of a hicle rim, the handle 46 is turned about stud 48 so to draw the nut 42 around stud 48, as shown in otted outline in FIGURE 2. This will permit the downrned end 36 of hook 38 to be withdrawn from one f the apertures 34a, 34b or 34c. The band 26 is then rapped about the bead flange 12a of the tire rim and, epending on the size of rim, the downturned end 36 is serted into the proper aperture.

In the embodiment disclosed, aperture 34a is intended or engagement with downturned end 36 of hook 38 for cking the shield on 14-inch rims. Apertures 34b and 4c are intended for use in locking the shield on 15-inch ms, the two different apertures necessary for accommoating so-called "small" and "large" 15-inch rims with hich vehicles may be equipped. It is to be understood at different aperture arrangements could be provided for cilitating adaptation of the shield for use with a greater ariety of rim sizes.

FIGURES 5 through 8 are illustrative of the protection fforded by the shield during the action of prying the tire ead over the bead flange of the rim. It is to be underood that a similar prying-type action is necessary for emounting the tire on a rim and forcing the tire bead ast the rim bead flange.

In FIGURE 5, a tire rim with a tire mounted thereon shown supported on a tire changing stand. A tire changg tool 16 is shown in phantom outline as having pried portion of the tire bead, also shown in phantom outline, ver the rim bead flange. Rotation of the tool about the eriphery of the rim will cause the tire tool to ride on the dge of the bead flange and continually pry the remainder f the tire bead over the edge of the rim as illustrated in IGURE 8.

One of the initial steps in tire demounting is to loosen r "break" the tire beads 54a and 54b away from the im bead seat and force the tire beads into the drop cener 56 of the vehicle rim. A tire tool is then inserted, enerally in the fashion shown in FIGURE 6, towards the rop center 56 of the rim to a point where the forward nd of the tool is inside the end of the tire bead 54a. he tool is then swung over the edge of the rim, using the ead flange as a fulcrum to pry one of the tire beads ver the edge, as shown in FIGURE 7. Continued rotaion of the tool relative to the rim when in the position hown in FIGURE 5 forces the remainder of the bead ver the edge of the rim as shown in FIGURE 8. It is o be noted that once the tool is rotated around the edge f the rim, the tire bead progresses over the edge of the im at an angle, or on the bias, relative thereto as best een in FIGURE 8.

FIGURES 6, 7 and 8 most clearly illustrate the proective function afforded by the shield 10. The band 26 nvelops the bead seat flange 12a and becomes the surface against which the tire tool is fulcrumed and over which the tool makes continual contact as the tool is driven around the periphery of the rim. Thus the bead flange 12a itself is spared the abusive contact and engagement with the tire tool and remains unscathed. Upon removal of shield 10, the soft metal or decoratively plated rim will retain its original beauty and particularly will be free of gouges and abrasions in the area of the bead flange.

Thus the shield 10 provides a means for protecting decorative or soft metal tire rims, and particularly the bead seat flange portions thereof, against marring and the like during the tire mounting and demounting operation. The rim shield may be easily manually manipulated by spreading the ends of the band portion apart and wrapping the same about the bead seat flange of a tire rim. The latching mechanism of the rim is adjustable to accommodate different sized tire rims and the over-center relationship of the pivotal attachment of the latching hook with respect to the pivotal mounting of the latch handle provides a convenient and facile means for securing the two free ends of the ring-like band together and locking the same about the periphery of the tire rim. Since the tire bead progresses over the bead flange area of the tire rim in a plane which is canted relative to the axis of the rim responsive to rotation of the tire tool around the rim periphery, the minor variations between the rear lower edge of the band 26 and inset portion of the tire rim are relatively inconsequential because the portions of the tire bead will not become caught therein.

The foregoing detailed description has been given for clearness of understanding only, and no unnecessary limitations should be understood therefrom, as some modifications may be obvious to those skilled in the art.

We claim:

1. A protective shield for temporary installation on a vehicle rim prior to mounting a tire onto a rim, or after the tire beads have been separated from the rim flange and prior to demounting the tire from the rim comprising: a generally circular band of substantially rigid material having substantially closely spaced apart free ends permitting the band to move relative of itself, said band being generally U-shaped in section and having a first upper surface and a second downwardly and inwardly extending surface for embracing the rim flange, a means on the upper surface of the band for joining the free ends together in a generally closed, immovable loop, including a hook member on the upper surface of the band adjacent one free end thereof, the hook member having a downturned terminal end, and hook engaging means including an apertured portion of the upper surface of the other free end with a plurality of spaced apertures for receiving the hooked downturned end of the hook member to close the band in an immovable loop about the flanges of different sized rims, the hook member being connected to a pivoted over center member on the one free end of the band whereby when the over center member is moved to the under center position, the downturned end of the hook member may be removed from or inserted into the apertures in the apertured member and when so inserted, the movement of the pivoted over center member to the over center position secures the downturned end of the hook member therein to close the band in an immovable loop.

2. The rim shield of claim 1 wherein the hook member and apertured portions of the upper surface are positioned in radially inwardly extending portions of the upper surface.

3. The rim shield of claim 1 wherein the upper surface is generally planar and the downwardly and inwardly extending surface is generally arcuate in section.

References Cited

UNITED STATES PATENTS

| | | | |
|---|---|---|---|
| 2,555,194 | 5/1951 | Kojan et al. | 53—329 X |
| 2,838,101 | 6/1958 | Carpenter | 157—1.21 |
| 2,923,346 | 2/1960 | Twiford | 157—1 |
| 2,926,726 | 3/1960 | Schultz | 157—1 |

TRAVIS S. McGEHEE, Primary Examiner